United States Patent [19]
DeVries

[11] Patent Number: 4,970,850
[45] Date of Patent: Nov. 20, 1990

[54] HARVESTING MACHINE

[76] Inventor: Jeffrey S. DeVries, 13530 Tyler, Holland, Mich. 49424

[21] Appl. No.: 378,373

[22] Filed: Jul. 11, 1989

[51] Int. Cl.⁵ ............................................. A01D 46/00
[52] U.S. Cl. ....................................... 56/15.5; 56/330; 56/DIG. 10
[58] Field of Search ...................... 56/330, 328.1, 14.9, 56/15.5, 15.6, DIG. 9, DIG. 19

[56] References Cited

U.S. PATENT DOCUMENTS

| | | | |
|---|---|---|---|
| 3,184,908 | 5/1965 | Rust | 56/330 |
| 3,344,591 | 10/1967 | Christie et al. | 56/330 |
| 3,439,482 | 4/1969 | Orton | 56/330 |
| 3,667,202 | 6/1972 | Watts | 56/330 |
| 4,441,305 | 4/1984 | Lippl | 56/15.6 |

FOREIGN PATENT DOCUMENTS 2371133  7/1978  France ................................. 56/330

Primary Examiner—Stephen J. Novosad
Attorney, Agent, or Firm—Waters, Morse & Harrington

[57] ABSTRACT

This blueberry harvesting machine is a side-by-side attachment to the standard farm tractor, secured to the tractor by the usual 3-point hitch. An outer wheel on the attachment supports much of the weight of the machine. A simplified beating mechanism knocks the berries loose from the bushes to fall on a collection system that extends ahead of the beaters and the frontal portion of the machine to receive berries knocked loose by the approach of the machine.

5 Claims, 5 Drawing Sheets

HARVESTING MACHINE

BACKGROUND OF THE INVENTION

The mechanized harvesting of blueberries is now well established. Machines are constructed to straddle the bushes, and subject them to the action of beaters that knock the berries loose to fall on a collection system that ultimately conveys the berries to a receptacle. The principle is simple, but there are practical difficulties. Mature blueberry bushes in Michigan tend to be about six to eight feet high, and the same in width. In the southern states, or where other varieties are grown, ten foot bushes are common. A self-powered and propelled machine capable of straddling and working over bushes of this size becomes an imposing and expensive structure.

These bushes may be expected to last from twenty years to indefinitely, but require about seven years to come into significant production. They are not effectively handled by the conventional machines until the bushes have had about 14 years of growth. Smaller bushes have been picked manually where market conditions and labor costs make this cost effective. The rest of the crop is just abandoned, along with a substantial loss that machines miss on the smaller bushes. Usually, it is not practical to pick bushes manually until they are over seven years old.

Field laborers are paid by the picked pound, but the lower limit of the earnings is set by minimum wage requirements. If work is scarce, workers may work for the lower returns. There is considerable reluctance to accept the continued bending-over that is associated with picking small bushes.

This invention is intended to provide a machine that can effectively pick bushes with about three years of growth, and continue to work on these bushes for the next 10 years. The larger conventional machines then take over. The first couple of years after the three-year beginning point will represent cost recovery; but after that, a profitable operation can be expected. Market conditions will determine the breakpoints, but the result of mechanizing the operations on the smaller bushes is a vast saving over manual harvesting. The need for large groups of migrant field hands, with the attendant problems, is reduced or eliminated entirely.

This machine was initially developed for harvesting blueberries, but has since been found useful (with minor modification) on vine crops such as grapes and tomatoes, and for blackberries and raspberries.

SUMMARY OF THE INVENTION

This machine is mounted on a tractor in a side-by-side relationship. The attachment to the tractor utilizes the usual three-point hitch. The outboard side of the machine has its own support wheel with a vertical positioning mechanism. This outer wheel is substantially coaxial with the drive wheels of the tractor, thus minimizing the turnaround distance required. This feature permits added bushes in a field of limited length. The system for receiving the berries knocked from the bushes is extended well ahead of the beating mechanism and the machine frame to receive berries knocked loose by the approach of the frontal frame structure of the machine. The lateral distance of the machine from the tractor is adjustable to accommodate various tractor configurations. A simplified beating mechanism removes the berries from the bushes.

DESCRIPTION OF THE PREFERRED EMBODIMENTS

Figure 1:
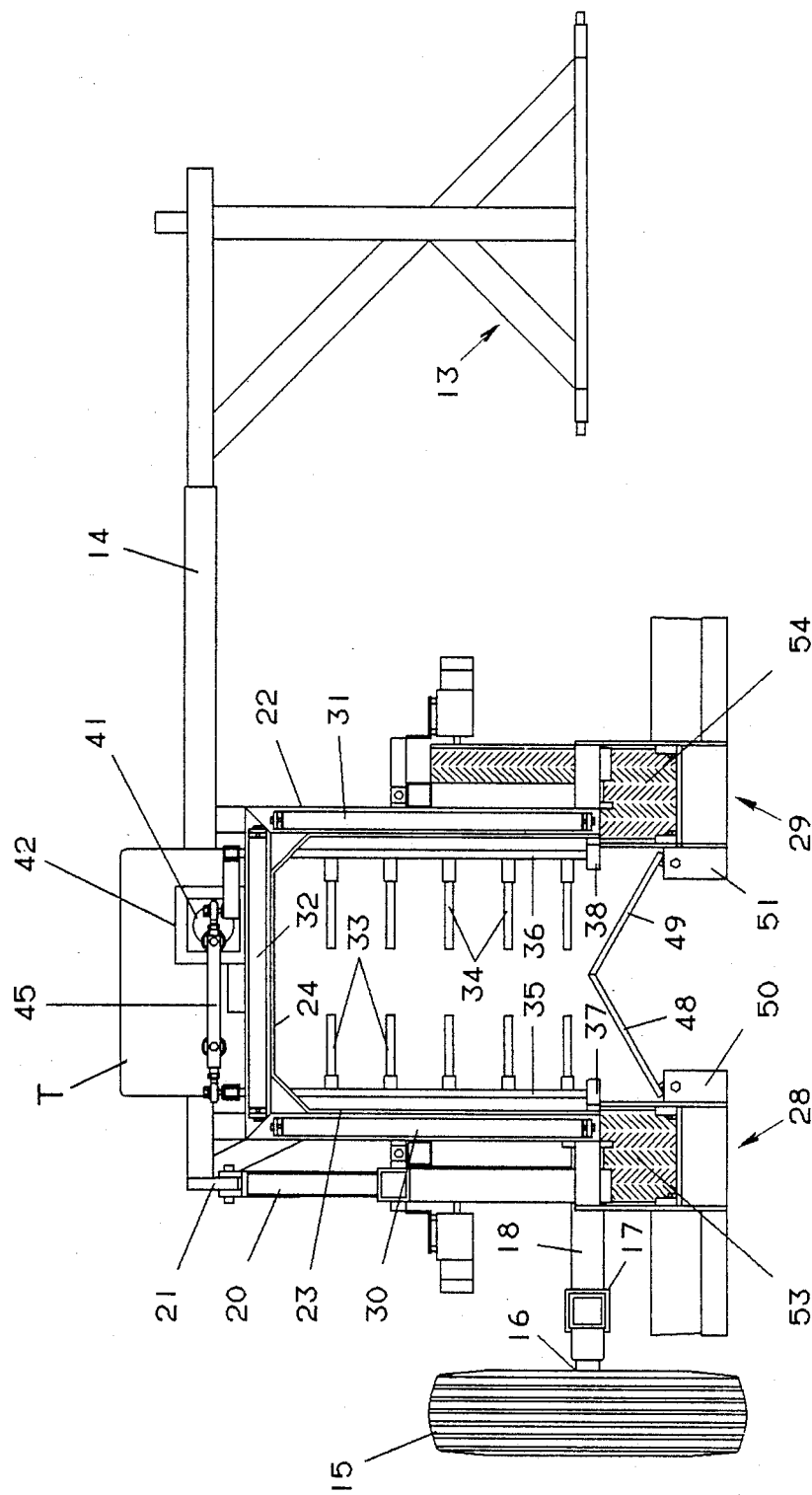
FIG. 1 is a front view of a machine embodying the present invention.
Figure 2:
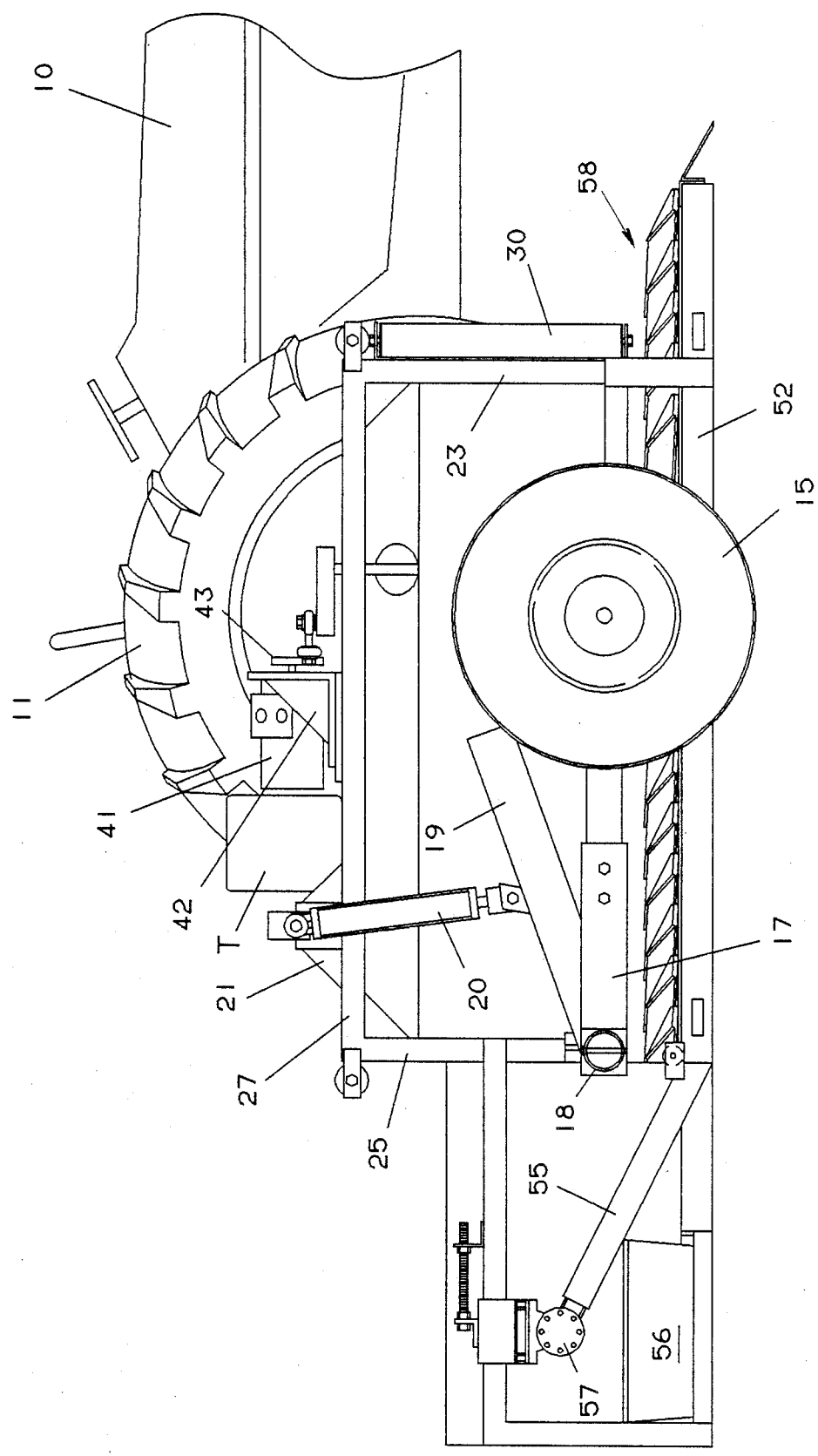
FIG. 2 is a side elevation with respect to FIG. 1.
Figure 5:
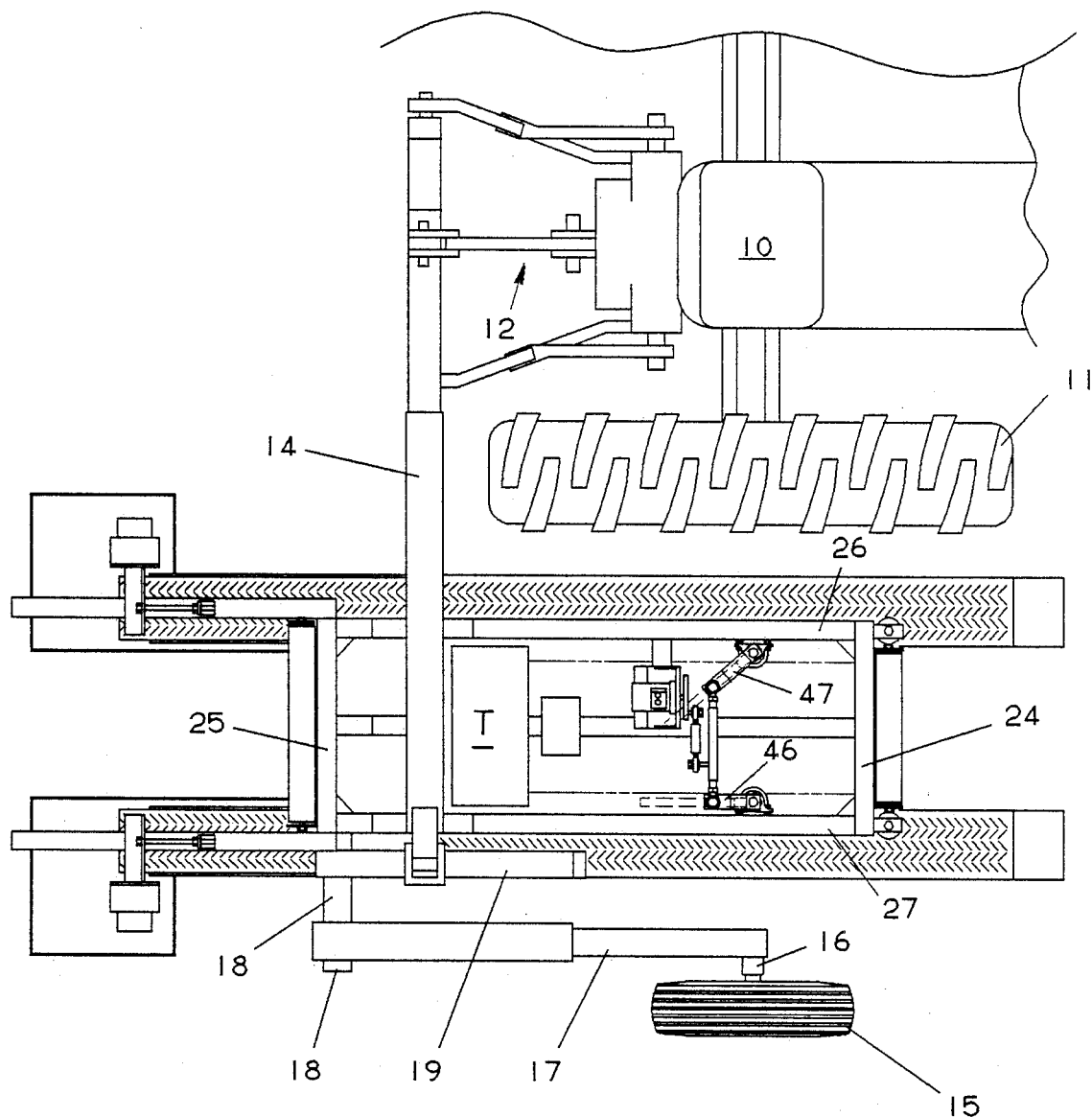
FIG. 5 is a top view of the machine.

Referring particularly to FIGS. 2 and 5, the illustrated harvesting machine is mounted as an attachment on the tractor generally indicated at 10 having the drive wheels 11. The usual three-point implement hitch is indicated generally at 12 in FIG. 5. The hitch engages with the coupling structure 13 shown in FIG. 1 to securely interconnect the machine with the tractor. The telescoping cantilever beam 14 interconnects the coupling structure with the machine, and is adjustable to accommodate tractors of various configurations. The tank T is provided for hydraulic fluid. The conventional hydraulic hoses and fittings are omitted for clarity.

The harvesting machine is additionally supported by the outboard wheel 15 mounted on the spindle 16 secured to the radius arm 17, and this arm is welded to the sleeve 18 rotatably mounted on a post (not shown) secured to the frame of the machine. A lever arm 19 is also welded to the sleeve 18, and is positioned by the hydraulic cylinder 20 acting against the bracket 21 mounted on the frame of the machine. Extension of the cylinder 20 will induce a clockwise rotation of the lever 19, the sleeve 18, and consequently the radius arm 17 and wheel 15 to vary the height of the machine with respect to ground level. The operation of the machine can thus be accommodated to slanting and uneven terrain, and operation of the cylinder 20 in conjunction with the position of the tractor hitch can raise or lower the machine while maintaining its reference to a horizontal plane to keep the active components of the machine as near as possible to the ground.

The frame of the machine is a generally U-shaped arch structure, as viewed from the front. The frontal portion of the frame is formed by the verticals 22 and 23 interconnected by the horizontal 24. A similar structure is indicated at the rear at 25, and these are interconnected by the upper longitudinal beams 26 and 27. At the lower extremities of the frame, the front and rear verticals are interconnected by the structure of the collector systems 28 and 29. The frame is adapted to straddle the bushes as the machine approaches them, and is eased into engagement with the bushes by the rollers 30 and 31 at the sides, and 32 at the top of the frame. Rollers may also be provided at the rear of the frame. Enclosure plates (not shown) may be added to the outside of the frame.

A pair of opposite beating devices is mounted for oscillation about vertical axes, and includes the beating arms 33 and 34 mounted respectively on the shafts 35 and 36. The arms 33 and 34 are preferably nylon rods received in radial sockets on the shafts. These shafts are pivotally mounted in bearings as shown at 37 and 38 secured to the frame, and in similar bearings 39 and 40

Figure 3:
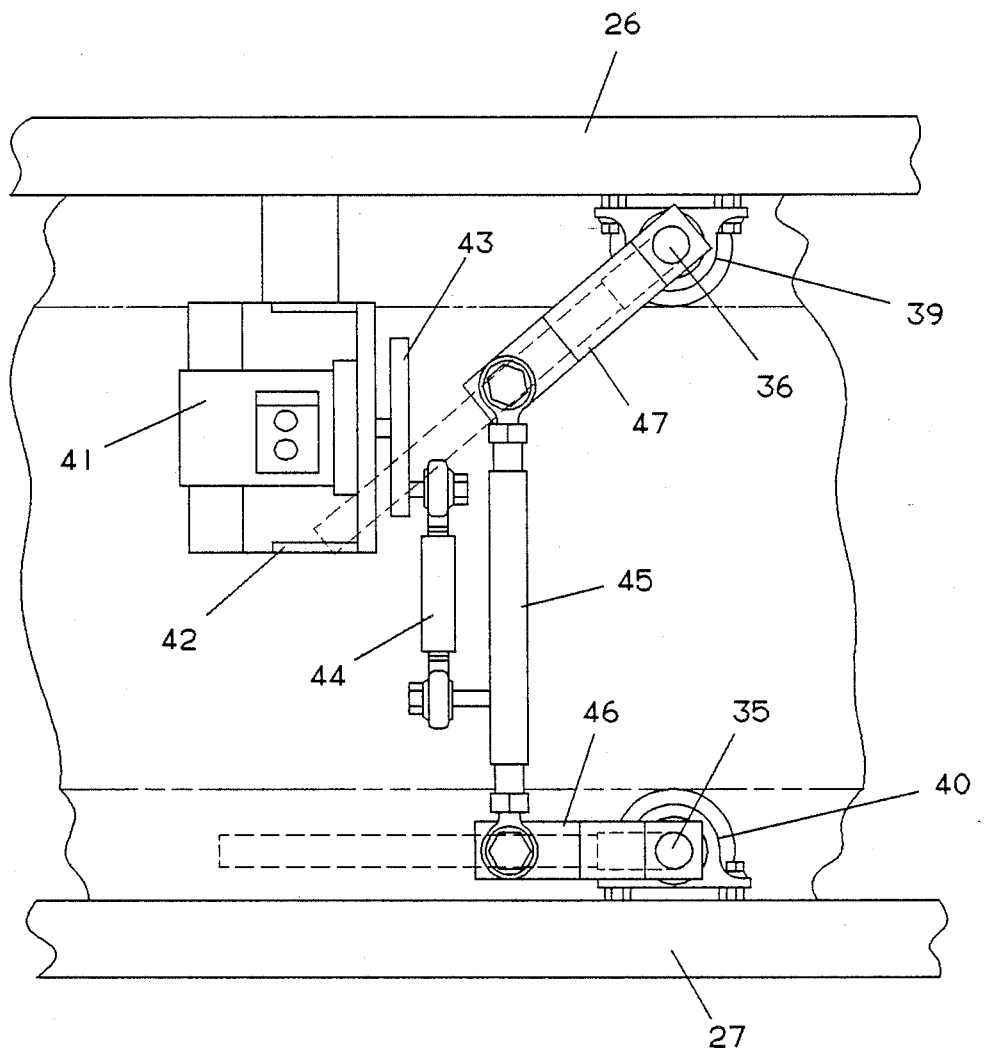
FIG. 3 is a plan view of the oscillating mechanism that drives the beaters.

(refer to FIG. 3) at the top of the shafts. The mechanism for inducing the oscillation of the beating arms is shown in FIG. 3, and includes the hydraulic motor 41 carried by the bracket 42 mounted on the machine frame, and driving the crank 43. The driving link 44 has the structure of a turnbuckle, and acts between the crank 43 and the connecting link 45 extending between the radius arms 46 and 47 associated respectively with the shafts 35 and 36 of the beaters. The geometry of this relationship produces desirable acceleration and deceleration patterns for the beaters acting within sectors that are adjustable by corresponding adjustments to the links 44 and 45. The speed of the hydraulic motor 41 is also a variable, making it possible to accommodate the machine to the various picking conditions that are encountered. In the early morning hours, the stems carrying the berries are frequently more flexible, and less inclined to hold the berries against dislodgement. The accumulation of moisture on the bushes during the night is usually responsible for this. Later on in the day, it becomes necessary to use a somewhat more active motion of the beaters in order to perform an effective picking operation. It should be noted that it is not necessary for the beaters to actually encounter each individual branch, as the oscillation imparted to part of the bush will tend to be transferred to the adjacent branches simply by the usual interengagement of the branches themselves. The beaters will average about 140 beats per minute. Maximum frequency is about 250 beats per minute. The beating sector will normally extend about forty-five degrees from the side of the machine; but under some conditions, the sectors may be made to overlap. These rates and sectors are all easily adjustable as noted.

Figure 4:
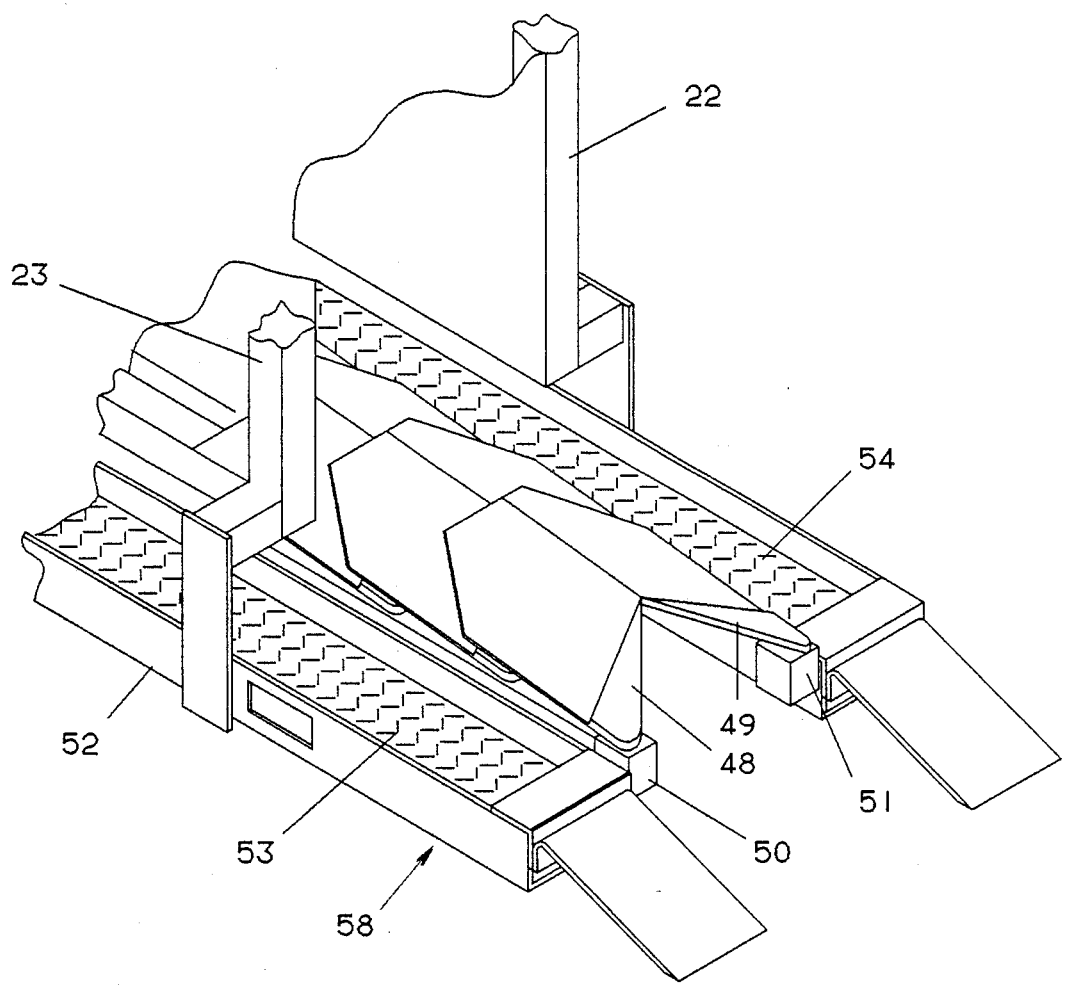
FIG. 4 is a fragmentary frontal perspective showing the extension of the collecting system ahead of the machine frame.

Berries knocked from the bushes by the beating mechanism are initially received by the groups of slanted plates 48 and 49 mounted on the opposite sides of the machine. (Refer to FIG. 4.) These series of plates are conventional, and are each mounted on a shaft slightly inclined to the vertical, and pivotally received in the brackets as shown at 50 and 51 in FIG. 1. The collection systems at the opposite sides of the machine each have longitudinal beams as shown at 52 in FIG. 2 carrying the brackets 50 and 51, and also carrying the conveyor belts 53 and 54. The plates 48 and 49 swing out of the way as the plants move through the frame of the machine, and return to the position shown in FIG. 1 after the heavier branches at the lower part of the bush pass through. The structure of these conveyors is also conventional, as far as the mechanical interrelationships are concerned. The conveyors move the berries to the rear, and up the inclined portion 55 of the conveyor to where they can be dropped into the receptacles 56. A power unit is generally indicated at 57 for operating the conveyor. While the functioning of the conveyor elements is conventional, the extension of the collector system ahead of the frontal portion of the frame is novel. Referring to FIG. 2, this portion indicated at 58 extends at least a foot, and preferably two feet ahead of the frame, and is capable of receiving berries knocked loose by the approach of the machine, prior to the point at which the bush is actually straddled by the frame and subject to the action of the beater mechanism. An optional modification of the machine is a pair of rods (not shown), one on each side of the machine, extending on an upward incline from the front of the portion 58 rearward to an elevated point on the frame to gently lift the lower branches of the bushes into the areas worked by the beaters. Experience with these machines has shown that the conventional harvesting equipment loses quite a number of berries that are knocked loose by the fixed structure of the machine prior to the moment at which the collection system can accept them. The collection system should not be more than nine inches above the ground to salvage as many berries as is practical from small bushes.

I claim:

1. A harvester having a frame forming an arch, beating means mounted for operation in said arch, collecting means at the opposite sides of said arch adjacent the lower extremities thereof, drive means for said beating means, and support means for said harvester, wherein the improvement comprises:
   vehicle means constituting part of said support means, said vehicle means having vertically moveable hitch means at the rear thereof, and also having rear wheel means;
   telescoping lateral beam means engageable with said hitch means, and secured for lateral adjustment to said frame beside said vehicle means; and
   frame wheel means mounted on said frame, and constituting an additional part of said support means.

2. A harvester having a frame forming an arch having a front-rear axis, beating means mounted for operation in said arch, collecting means at the opposite sides of said arch adjacent the lower extremities thereof, drive means for said beating means, and support means for said harvester, wherein the improvement comprises:
   telescoping lateral beam means secured for lateral adjustment to said frame perpendicular to said arch axis and adapted for attachment to a vehicle for placement of said harvester at the side of said vehicle; and
   frame wheel means constituting part of said support means, and mounted on said frame for rotation on an axis perpendicular to said arch axis.

3. A harvester having a frame forming an arch having a front-rear axis, beating means mounted for operation in said arch, collecting means at the opposite sides of said arch adjacent the lower extremities thereof, drive means for said beating means, and support means for said harvester, wherein the improvement comprises:
   lateral beam means secured to said frame perpendicular to said arch axis and adapted for attachment to a vehicle for placement of said harvester at the side of said vehicle;
   frame wheel means constituting part of said support means, and mounted on said frame for rotation on an axis perpendicular to said arch axis; and
   said beating means includes laterally spaced beaters mounted on said frame for oscillation about vertical axes, and having shafts and radius arms secured to said shafts, respectively, said beating means also including a connecting link interconnecting said radius arms, motor means having a crank, and a driving link interconnecting said crank and said connecting link.

4. A harvester having a frame forming an arch having a front-rear axis, beating means mounted for operation in said arch, collecting means at the opposite sides of said arch adjacent the lower extremities thereof, drive means for said beating means, and support means for said harvester, wherein the improvement comprises:
   lateral beam means secured to said frame perpendicular to said arch axis and adapted for attachment to a vehicle for placement of said harvester at the side of said vehicle;

frame wheel means constituting part of said support means, and mounted on said frame for rotation on an axis perpendicular to said arch axis; and said collecting means extending parallel to said arch axis beyond said frame.

5. A harvester as defined in claim 4, wherein said collecting means extends at least one foot beyond said frame.

* * * * *